(12) United States Patent
Bruno et al.

(10) Patent No.: US 8,190,411 B2
(45) Date of Patent: May 29, 2012

(54) METHOD AND SYSTEM FOR PAR OPTIMIZATION

(75) Inventors: Jeffrey Bruno, Foothill Ranch, CA (US); Christopher M. Hawke, Chicago, IL (US); Kimberly C. Gravell, Powell, OH (US)

(73) Assignee: Allegiance Corporation, McGaw Park, IL (US)

( * ) Notice: Subject to any disclaimer, the term of this patent is extended or adjusted under 35 U.S.C. 154(b) by 773 days.

(21) Appl. No.: 12/338,705

(22) Filed: Dec. 18, 2008

(65) Prior Publication Data

US 2009/0259504 A1 Oct. 15, 2009

Related U.S. Application Data

(60) Provisional application No. 61/006,091, filed on Dec. 18, 2007.

(51) Int. Cl.
*G06F 17/50* (2006.01)

(52) U.S. Cl. .......................................................... 703/6
(58) Field of Classification Search ........................ 703/6
See application file for complete search history.

(56) References Cited

U.S. PATENT DOCUMENTS

| | | | |
|---|---|---|---|
| 2004/0181464 A1* | 9/2004 | Vanker et al. | 705/26 |
| 2005/0119919 A1* | 6/2005 | Eder | 705/4 |

\* cited by examiner

*Primary Examiner* — Dwin M Craig
(74) *Attorney, Agent, or Firm* — Arent Fox

(57) ABSTRACT

Methods and systems for optimizing a product supply chain, including managing and maintaining an optimum product inventory with respect to stock levels, frequency of use, and replenishment intervals for products in a clinical setting. Actual or historical par data and simulation parameters, such as par types, delivery schedules, and/or vendor settings, are received or updated, and one or more simulations are performed. The product supply chain is optimized based on the results of the simulations.

21 Claims, 16 Drawing Sheets

| Vendor Settings | | |
|---|---|---|
| Vendor | Lead Time (days) | VL Vendor |
| ABRAMS CLARK | 1 | ☐ |
| ADVANCED MEDICAL SYSTEMS INC | 1 | ☐ |
| AIRGAS | 1 | ☐ |
| ALCON SURGICAL INC | 1 | ☐ |
| ARGON MEDICAL | 1 | ☐ |
| ARROW INTERNATIONAL, INC | 3 | ☐ |
| BAGS OF BAGS | 1 | ☐ |
| BALLARD MEDICAL PRODUCTS | 1 | ☐ |
| BARD ACCESS SYSTEMS | 1 | ☐ |
| BARD ELECTROPHYSIOLOGY | 1 | ☐ |
| BAXTER HEALTHCARE CORPORATION | 1 | ☐ |
| BECTON KINSON & COMPANY | 1 | ☐ |
| BERKELEY MEDEVICES INC | 1 | ☐ |
| BIOSEAL MEDICAL PACKAGING | 1 | ☐ |
| BOSTON SCIENTIFIC CORP | 1 | ☐ |
| BRISTOL MYERS SQUIBB CO | 1 | ☐ |
| BUNNEQ INC | 1 | ☐ |
| CARDINAL DISTRIBUTION | 1 | ☐ |
| CARDINAL HEALTH MEDICAL PRODUCTS | 1 | ☐ |
| CARDINAL VALUELINK | 1 | ☑ |
| COOK INCORPORATED | 1 | ☐ |
| CR BARD INC | 1 | ☐ |
| CROSS TIMBERS CORPORATION | 1 | ☐ |
| DEROYAL INDUSTRIES | 1 | ☐ |
| DESIGNERS INC | 1 | ☐ |

FIG.3B

Par Location Order Schedules

| Station Key | Cost Center | Station/Par Loc | Critical? | ABC | Order Days Sun | Mon | Tue | Wed | Thu | Fri | Sat | Days Include | Cent. Store | Sun | Mon | Tue | Wed | Thu | Fri | Sat |
|---|---|---|---|---|---|---|---|---|---|---|---|---|---|---|---|---|---|---|---|---|
| | | | | | | | | | | | | | | | | Total Demand Lines | | | | |
| | | | | | | | | | | | | | | | | Total Replenishment Lines | | | | |
| 1 | 601001 | M7E | ☐ | A | 0 | 1 | 1 | 1 | 1 | 1 | 0 | ☐ | ☐ | 1,855 | 1,974 | 2,044 | 1,950 | 1,931 | 2,011 | 1,938 |
| | | | | | | | | | | | | | | 1,182 | 1,209 | 1,353 | 1,265 | 1,250 | 1,272 | 1,265 |
| 2 | 601001 | M75 | ☐ | A | 1 | 1 | 1 | 1 | 1 | 1 | 1 | ☐ | ☐ | 1,823 | 2,028 | 1,985 | 1,959 | 1,952 | 1,946 | 1,929 |
| | | | | | | | | | | | | | | 1,076 | 1,309 | 1,978 | 1,336 | 1,361 | 1,244 | 1,270 |
| 3 | 601002 | M35 | ☐ | A | 1 | 1 | 1 | 1 | 1 | 1 | 1 | ☐ | ☐ | 1,640 | 1,754 | 1,830 | 1,011 | 1,803 | 1,731 | 1,666 |
| | | | | | | | | | | | | | | 845 | 891 | 985 | 1,066 | 1,129 | 1,033 | 954 |
| 4 | 605000 | Pedicu | ☐ | A | 1 | 1 | 1 | 1 | 1 | 1 | 1 | ☑ | ☐ | 1,075 | 2,022 | 2,107 | 2,137 | 2,095 | 2,059 | 2,107 |
| | | | | | | | | | | | | | | 1,152 | 1,247 | 1,325 | 1,275 | 1,356 | 1,278 | 1,432 |
| 5 | 607000 | Inf276 | ☐ | A | 1 | 1 | 1 | 1 | 1 | 1 | 0 | ☑ | ☐ | 958 | 1,008 | 1,031 | 1,039 | 975 | 1,009 | 949 |
| | | | | | | | | | | | | | | 619 | 620 | 656 | 718 | 636 | 662 | 642 |
| 6 | 607000 | Inf278 | ☐ | B | 0 | 1 | 1 | 1 | 1 | 1 | 0 | ☑ | ☐ | 574 | 661 | 642 | 644 | 617 | 620 | 603 |
| | | | | | | | | | | | | | | 352 | 397 | 374 | 419 | 372 | 399 | 402 |
| 7 | 607000 | Inf278-B | ☐ | C | 0 | 1 | 1 | 1 | 1 | 1 | 0 | ☑ | ☐ | 233 | 280 | 262 | 271 | 255 | 262 | 251 |
| | | | | | | | | | | | | | | 140 | 185 | 190 | 171 | 171 | 162 | 172 |
| 8 | 607000 | Inf280 | ☐ | C | 0 | 1 | 1 | 1 | 1 | 1 | 0 | ☑ | ☐ | 88 | 96 | 95 | 94 | 87 | 85 | 82 |
| | | | | | | | | | | | | | | 56 | 42 | 58 | 52 | 51 | 44 | 45 |
| 9 | 607000 | Inf280A | ☐ | B | 0 | 1 | 1 | 1 | 1 | 1 | 0 | ☑ | ☐ | 503 | 490 | 505 | 517 | 516 | 521 | 485 |
| | | | | | | | | | | | | | | 311 | 282 | 266 | 329 | 315 | 307 | 280 |
| 10 | 607000 | Inf281 | ☐ | B | 0 | 1 | 1 | 1 | 1 | 1 | 0 | ☑ | ☐ | 572 | 597 | 520 | 558 | 572 | 577 | 555 |
| | | | | | | | | | | | | | | 340 | 361 | 343 | 339 | 368 | 342 | 354 |
| 11 | 607000 | Inf288 | ☐ | A | 1 | 1 | 1 | 1 | 1 | 1 | 1 | ☐ | ☐ | 1,406 | 1,542 | 1,506 | 1,517 | 1,534 | 1,472 | 1,425 |
| | | | | | | | | | | | | | | 793 | 932 | 903 | 946 | 985 | 930 | 903 |
| 12 | 615010 | M3W | ☐ | A | 1 | 1 | 1 | 1 | 1 | 1 | 1 | ☐ | ☐ | 1,283 | 1,292 | 1,313 | 1,320 | 1,320 | 1,323 | 1,293 |
| | | | | | | | | | | | | | | 737 | 780 | 754 | 808 | 833 | 805 | 847 |
| | | | | | | | | | | | | | | 51041 | 56357 | 57407 | 56921 | 56613 | 55692 | 53244 |
| | | | | | | | | | | | | | | 26822 | 30154 | 34118 | 34073 | 35224 | 34301 | 32451 |

FIG. 3C

| Summary Stats vs. Baseline | | | | | | | |
|---|---|---|---|---|---|---|---|
| | New | Baseline | % Chg | | New | Baseline | % Chg |
| Par Inventory $ (000s)< | | | | Service Level: | 100.00% | 95.1% | |
| Average $ | 76 | 23 | 224.9% | | | | |
| Min: | 66 | 23 | | Product Value / Replen Line: | 53.33 | 5.35 | |
| Max: | 83 | 25 | | | | | |
| Point of Use Demand Lines (at Station)< | | | | Replenishment Order Lines: | | | |
| Totals: | 35,714 | 35,714 | 0.0% | Totals: | 3,777 | 35,515 | -89.4% |
| Days w/ Lines: | 90 | 90 | | Days w/Lines: | 65 | 91 | |
| Average: | 397 | 397 | | Average: | 58 | 390 | |
| Min: | 202 | 202 | | Min: | 26 | 2 | |
| Max: | 455 | 455 | | Max: | 102 | 453 | |
| Replenishment Lines - Non VL: | | | | Replenishment Lines - VL: | | | |
| Totals: | 620 | 6,886 | -91.0% | Totals: | 3,157 | 28,429 | -88.9% |
| Days w/ Lines: | 65 | 65 | | Days w/Lines: | 65 | 89 | |
| Average: | 10 | 10 | | Average: | 49 | 319 | |
| Min: | 2 | 2 | | Min: | 10 | 215 | |
| Max: | 32 | 32 | | Max: | 93 | 367 | |
| Stockouts: | | | | | | | |
| Totals: | 5 | 1,767 | -99.7% | | | | |
| Days w/ SO: | 5 | 90 | | | | | |
| Average: | 0 | 0 | | | | | |
| Min: | 0 | 0 | | | | | |
| Max: | 1 | 1 | | | | | |

FIG.4C

Summary Stats - Different Par Types

| Par Type | | Inv $ (000s) Cent Stores* | Par Locs | Demand Lines | Repl. Order Lines | Non VL Lines | VL Lines | Stockouts | Service Level | Prod $ / Repl Line | Scenario Run Time |
|---|---|---|---|---|---|---|---|---|---|---|---|
| 1 | Current Settings | 578.8 | 22.4 | 35,714 | 24,859 | 5,131 | 19,728 | 3831 | 89.3% | 6.69 | |
| 2 | Multiple of Max | 470.6 | 86.8 | 35,714 | 8,957 | 1,724 | 7,233 | 0 | 100.0% | 22.40 | |
| 3 | EOQ | 470.6 | 76.1 | 35,714 | 3,772 | 624 | 3,148 | 3 | 100.0% | 53.20 | |
| 4 | Saved Settings | 470.6 | 75.9 | 35,714 | 3,669 | 621 | 3,048 | 4 | 100.0% | 54.67 | |
| 5 | Mult and EOQ | 470.6 | 76.1 | 35,714 | 3,777 | 620 | 3,157 | 5 | 100.0% | 53.33 | |
| Baseline | | 578.8 | 23.4 | 35,714 | 35,515 | 6,886 | 28,429 | 1767 | 95.1% | 5.35 | |

FIG. 4D

Summary Stats - Different Par Types

| Par_type: 2 | Multiple of Max | Date: | | 10:51:03 AM |
|---|---|---|---|---|

Par Inventory $ (000s)<

| Average $ | 86.8 | Service Level: | 100.00% |
|---|---|---|---|
| Min: | 81.5 | | |
| Max: | 90.1 | Product Value / Replen Line: | 22.40 |

Point of Use Demand Lines (at Station)<

| Totals: | 35,714 | Replenishment Order Lines: | |
|---|---|---|---|
| Days w/ Lines: | 90 | Totals: | 8,957 |
| Average: | 396.8 | Days w/Lines: | 65 |
| Min: | 202 | Average: | 137.8 |
| Max: | 455 | Min: | 56 |
| | | Max: | 368 |

Replenishment Lines - Non VL:

| Totals: | 1,724 | Replenishment Lines - VL: | |
|---|---|---|---|
| Days w/ Lines: | 65 | Totals: | 7,233 |
| Average: | 26.5 | Days w/Lines: | 65 |
| Min: | 5 | Average: | 111.3 |
| Max: | 88 | Min: | 42 |
| | | Max: | 305 |

Stockouts:

| Totals: | 0 |
|---|---|
| Days w/ SO: | 0 |
| Average: | 0.0 |
| Min: | 0 |
| Max: | 0 |

FIG. 4E

Summary Stats by Station

| Station_CC | Par Inv $ (000s) | Demand Lines | Repl. Order Lines | Non VL Lines | VL Lines | Stockouts | Service Level | Prod $ / Replen Line |
|---|---|---|---|---|---|---|---|---|
| 1 INF276_607000 | 15.0 | 6,969 | 736 | 98 | 638 | 0 | 100.0% | 55.92 |
| 2 INF278_607000 | 6.6 | 4,361 | 432 | 49 | 383 | 1 | 100.0% | 42.76 |
| 3 INF278-B_607000 | 4.5 | 1,817 | 164 | 38 | 126 | 1 | 99.9% | 118.26 |
| 4 INF280_607000 | 2.5 | 627 | 77 | 13 | 64 | 1 | 99.8% | 24.38 |
| 5 INF280A_607000 | 5.7 | 3,537 | 403 | 50 | 353 | 1 | 100.0% | 29.94 |
| 6 INF281_607000 | 5.6 | 4,001 | 482 | 101 | 381 | 0 | 100.0% | 27.10 |
| 7 PEDICU_605000 | 36.2 | 14,402 | 1,483 | 271 | 1,212 | 1 | 100.0% | 64.33 |
| Totals | 76.1 | 35,714 | 3,777 | 620 | 3,157 | 5 | 100.0% | 53.33 |

FIG.4G

Summary Stats by Vendor

| Vendor | Par Inv $ (000s) | Demand Lines | Repl. Order Lines | Non VL Lines | VL Lines | Stockouts | Service Level | Prod $ / Replen Line |
|---|---|---|---|---|---|---|---|---|
| 1 ARROW INTERNATIONAL, INC. | 0.2 | 5 | 2 | 2 | 0 | 0 | 100.0% | 40.83 |
| 2 BAGS-OF-BAGS | 0.0 | 6 | 0 | 0 | 0 | 0 | 100.0% | 0.00 |
| 3 BARD ACCESS SYSTEMS | 0.0 | 0 | 1 | 1 | 0 | 0 | 100.0% | 8.32 |
| 4 BAXTER HEALTHCARE CORPOR | 0.1 | 52 | 1 | 1 | 0 | 0 | 100.0% | 201.77 |
| 5 BECTON DICKINSON & COMPAN | 0.3 | 0 | 1 | 1 | 0 | 0 | 100.0% | 56.76 |
| 6 CARDINAL DISTRIBUTION | 0.1 | 81 | 1 | 1 | 0 | 0 | 100.0% | 186.24 |
| 7 CARDINAL HEALTH MEDICAL PR | 9.0 | 2,812 | 227 | 206 | 21 | 1 | 100.0% | 70.58 |
| 8 CARDINAL VALUELINK | 47.0 | 28,669 | 3,149 | 13 | 3,136 | 4 | 100.0% | 45.78 |
| 9 COOK INCORPORATED | 0.6 | 13 | 2 | 2 | 0 | 0 | 100.0% | 246.00 |
| 10 CR BARD INC | 0.0 | 6 | 0 | 0 | 0 | 0 | 100.0% | 0.00 |
| 11 DEROYAL INDUSTRIES | 0.0 | 42 | 0 | 0 | 0 | 0 | 100.0% | 0.00 |
| 12 E.M. ADAMS INC | 0.1 | 12 | 1 | 1 | 0 | 0 | 100.0% | 86.25 |
| 13 HOLLISTER INC | 0.0 | 1 | 0 | 0 | 0 | 0 | 100.0% | 0.00 |
| 14 HOSPIRA WORLDWIDE INC | 1.4 | 567 | 14 | 14 | 0 | 0 | 100.0% | 176.48 |
| 15 INTEGRA LIFESCIENCES CORPO | 0.7 | 8 | 8 | 8 | 0 | 0 | 100.0% | 142.14 |
| 16 KENDALL HEALTHCARE PRODU | 0.1 | 18 | 1 | 1 | 0 | 0 | 100.0% | 72.30 |
| 17 KENTEC MEDICAL INC | 3.4 | 648 | 34 | 34 | 0 | 0 | 100.0% | 240.35 |
| 18 MALLINCKRODT INC | 0.7 | 82 | 7 | 7 | 0 | 0 | 100.0% | 496.40 |
| 19 MEDELA INC | 1.6 | 255 | 15 | 15 | 0 | 0 | 100.0% | 264.57 |
| 20 MEDICAL COMPONENTS INC | 0.7 | 0 | 2 | 2 | 0 | 0 | 100.0% | 73.92 |
| 21 MEDI-KID CO | 0.6 | 77 | 6 | 6 | 0 | 0 | 100.0% | 310.33 |
| 22 MEMORIAL HEALTH SERVICES | 0.0 | 583 | 177 | 177 | 0 | 0 | 100.0% | 0.02 |
| 23 None | 0.0 | 0 | 2 | 2 | 0 | 0 | 100.0% | 0.00 |

FIG. 4H

METHOD AND SYSTEM FOR PAR OPTIMIZATION

CROSS-REFERENCE TO RELATED APPLICATIONS

This application claims the benefit of U.S. Provisional Application No. 61/006,091 titled METHOD AND SYSTEM FOR PAR OPTIMIZATION filed on Dec. 18, 2007, the entirety of which is incorporated by reference herein.

BACKGROUND OF THE INVENTION

1. Field of the Invention

Aspects of the present invention are directed to methods and systems for managing point-of-use par levels. Specifically, aspects of the present invention are directed to optimizing a product supply chain, including managing and maintaining an optimum product inventory with respect to stock levels, frequency of use, and replenishment intervals for products in a clinical setting.

2. Background of the Related Art

One problem that exists in the art today is that there is no consistent or sufficient method and system for point-of-use entities, such as hospitals, to effectively manage their inventories of point-of-use products, including preventing over- and/or under-stocking of specific products and ensuring optimal delivery schedules and/or product quantities. Further, there is no sufficient method and system for effective inventory management of point-of-use locations, such as emergency rooms or nursing stations, which house a number of point-of-use products. In addition, although many of these entities have inventory data available, they do not have the inventory expertise and/or the analytical capability to obtain the optimum par levels, delivery schedules, and/or delivery quantities.

Yet another problem in the art today is that there is currently no sufficient method and system for a consumption-driven approach to the supply chain to ensure a stable demand pattern and inventory management environment. There exists no sufficient method and system today that allows point-of-use entities to optimize internal delivery costs for various products or point-of-use locations.

In addition, there currently exists no sufficient simulation tool that would allow a point-of-use entity to implement various strategies or scenarios of product use for setting optimal product par levels, optimal delivery schedules, and/or product quantities, nor is there a sufficient simulation tool that would allow a point-of-use entity to select and implement a specific strategy/scenario.

There remains a need in the art, therefore, for methods and systems that ensure effective management of point-of-use products, including preventing over- and/or under-stocking of specific products, and optimal delivery schedules and/or product delivery quantities. There is yet another unmet need in the art for effective inventory management of points-of-use, such as emergency rooms or nursing stations, which house a number of point-of-use products. There is a further unmet need in the art for methods and systems that implement high-level inventory expertise and/or analytical capabilities to obtain optimum point-of-use parameters, such as par levels, delivery schedules, and/or delivery quantities. There is yet a further unmet need in the art for a consumption-driven approach to the supply chain that ensures a stable demand pattern and inventory management environment. There is yet a further unmet need in the art for methods and systems that allow point-of-use entities to optimize internal delivery costs for various products or point-of-use locations. There is a further unmet need in the art for a simulation tool that allows point-of-use entities to implement various strategies or scenarios of product use for setting optimal product par levels, optimal delivery schedules, and/or product quantities, and that allows a point-of-use entity to select and implement a specific strategy.

SUMMARY OF THE INVENTION

The present invention addresses the above identified needs, as well as others, via methods and systems that ensure effective management of point-of-use products, including preventing over- or under-stocking of specific products, and optimal delivery schedules, and/or product delivery quantities. In one aspect, the present invention provides effective inventory management of point-of-use locations, such as emergency rooms and nursing stations, which house a number of point-of-use products. Further, the present invention provides a method and system that implement high-level inventory expertise and/or analytical capabilities to provide optimum point-of-use parameters, such as par levels, delivery schedules and/or product delivery quantities. In accordance with one aspect, the present invention allows point-of-use entities to optimize internal delivery costs for various products or point-of-use locations. The method and system of the present invention provide a consumption-driven approach to the supply chain that ensures a stable demand pattern and inventory management environment. Moreover, aspects of the present invention provide a simulation tool that allows point-of-use entities to implement various strategies or scenarios of product use for setting optimal point-of-use parameters, such as product par levels, delivery schedules, and/or product quantities, and that allow a point-of-use entity to select and implement a specific strategy.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

The features of the invention will be more readily understood with reference to the following description and the attached drawings, wherein:

FIGS. 3A-3D show exemplary Graphic User Interface (GUI) screens of various aspects of the method and system for par optimization, in accordance with aspects of the present invention;

FIGS. 4A-4H show exemplary simulation results in the form of report summaries, in accordance with aspects of the present invention;

DETAILED DESCRIPTION

Figure 1:
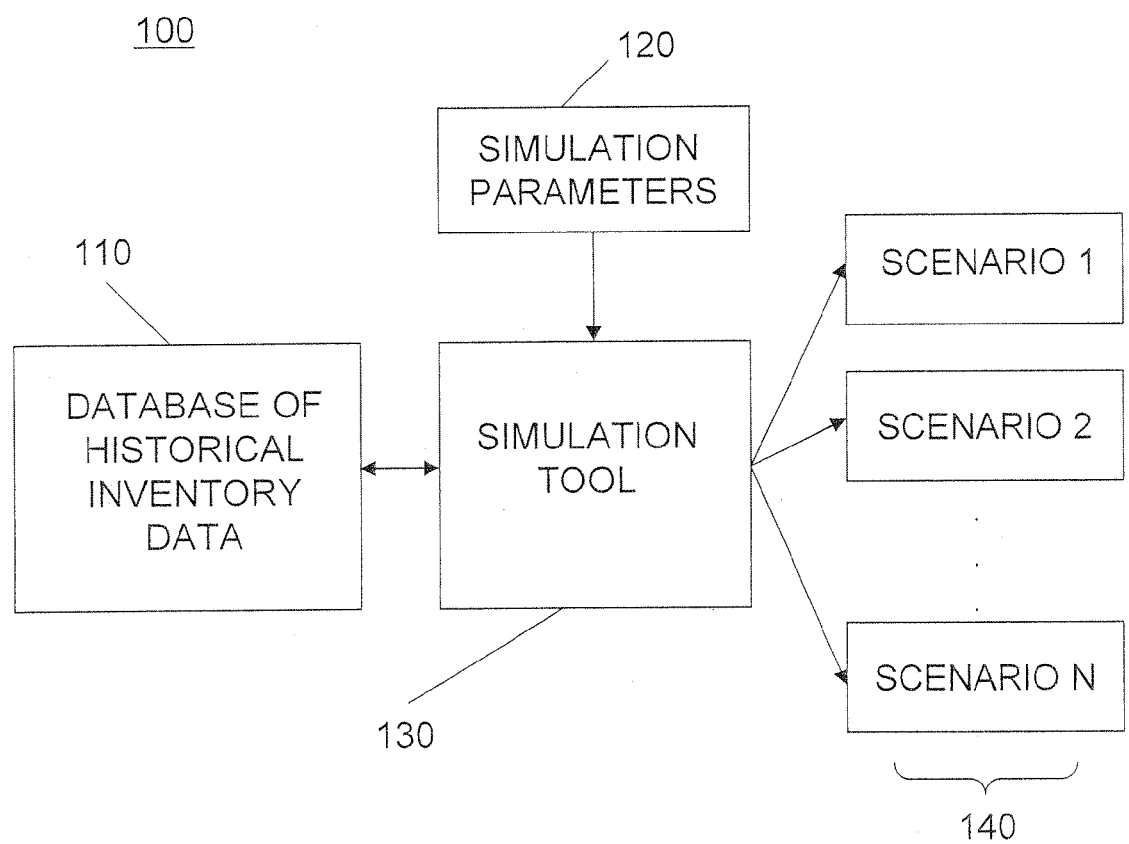
FIG. 1 illustrates an example of the open system architecture of the present invention, for use in accordance with aspects of the present invention.

Referring now to FIG. 1, therein shown is an example of an open system architecture 100, for use in accordance with aspects of the present invention. Data repository (e.g., database) 110 stores actual historical inventory data for at least one point-of-use entity. The data is input into Simulation Tool 130, which, upon changing various simulation parameters 120, produces various inventory scenarios 140.

Figure 2:
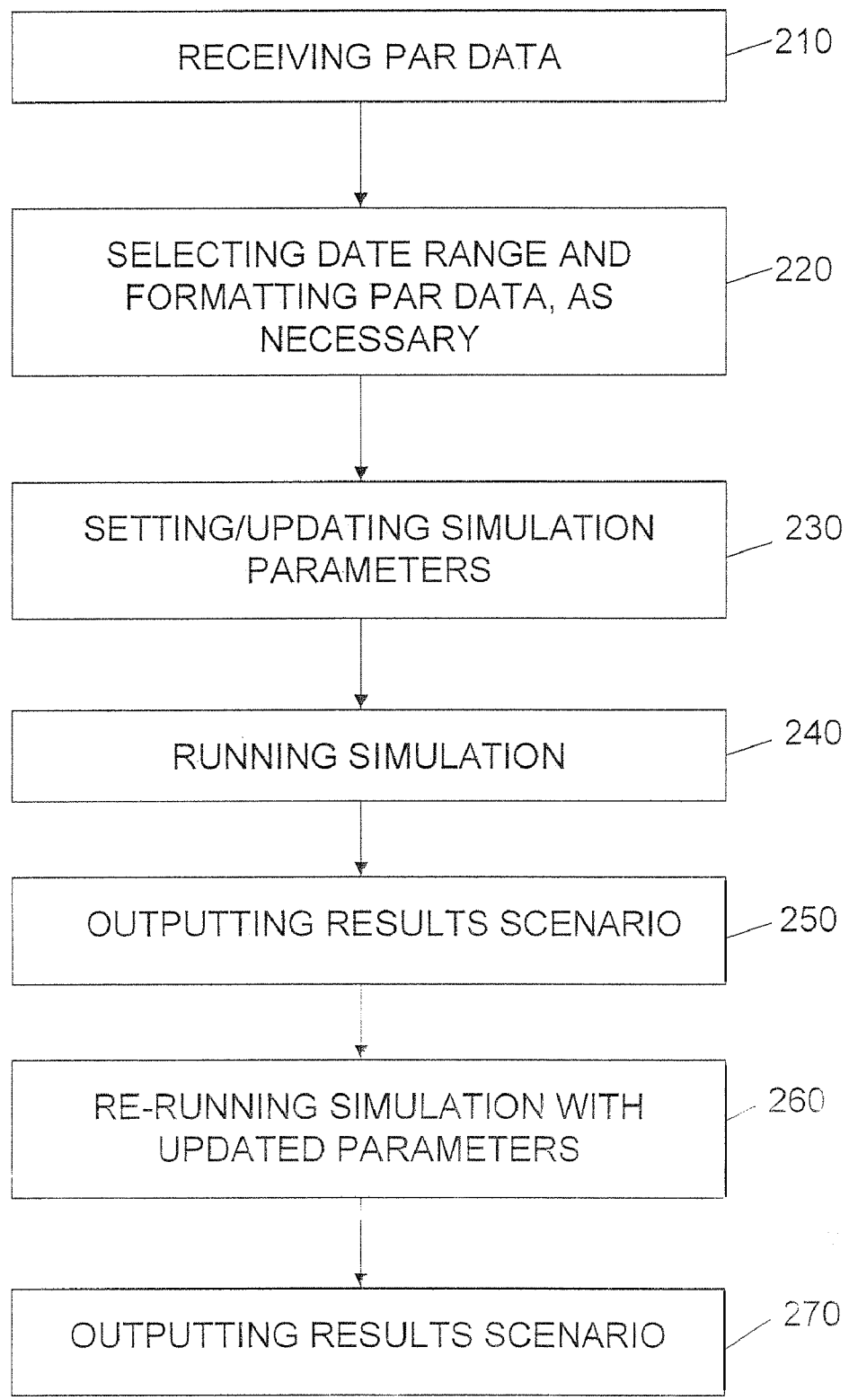
FIG. 2 shows an exemplary flowchart of a method for providing access to establishing optimal product par levels, optimal delivery schedules, and/or product quantities in accordance with an aspects of the present invention.

Referring now to FIG. 2, therein shown is an exemplary flowchart for a method for par optimization, in accordance with aspects of the present invention. Actual or historical par data for an entity is received 210. A date range for the simulation is selected, and the par data is formatted, if needed, 220. Simulation parameters, such as par types, delivery schedules, and/or vendor settings, are set/updated 230. The simulation is conducted 240. The results for the scenario are output 250. The parameters are updated and the simulation re-run 260 as appropriate. An optimal scenario is selected 270.

Figure 3A:
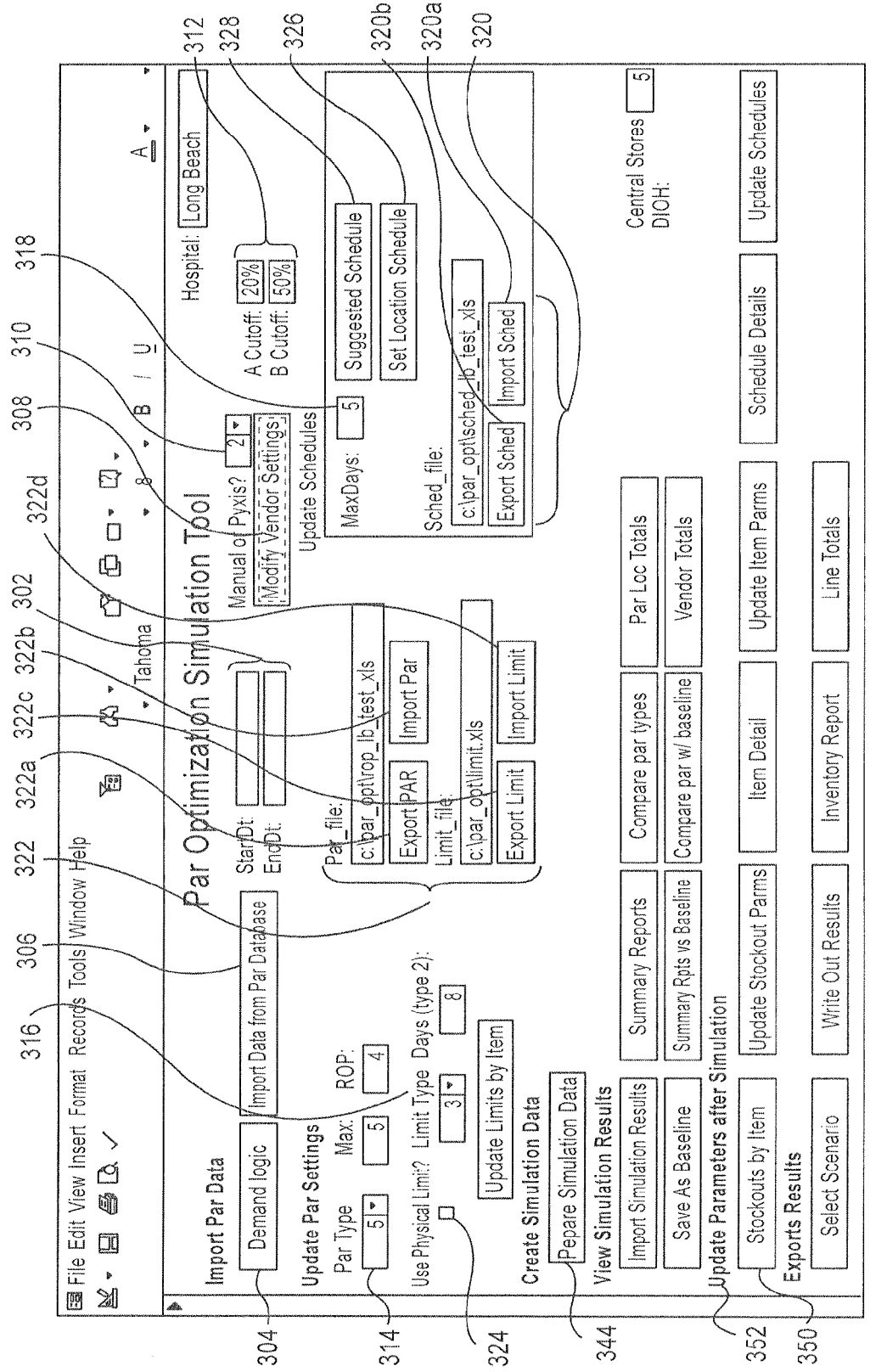

Referring now to FIGS. 3A-3D, therein shown are exemplary Graphic User Interface (GUI) screens in accordance with various aspects of the methods and systems for par optimization of the present invention. FIG. 3A shows a GUI screen for importing par data from an end-user (interchangeably also referred to herein as a point-of-use entity), such as a medical clinic or hospital. The imported par data may include, for example, types of products used, inventory settings for each product at each relevant location, and a transaction history for each location. The imported par data is formatted, and a date range is set 302 (e.g., three months), such that any spikes or other unusual situations, for example holidays, may be accounted for.

The imported data may be obtained manually, via an automated medication and supply management system, such as Cardinal Health's Pyxis® dispensing machine, or by any other available means at the point-of-use. It will be apparent to those of ordinary skill in the art that when precise data, such as the data obtained via a Pyxis® dispensing machine on, for example, exact quantities of supplies available, exact replenishment quantities and times, approximated data for these, and/or other parameters may be used. Thus, manual data, for example, may be formatted to approximate Pyxis® data, via the "Demand Logic" button 304.

The data may be imported, for example, by selecting the "Import Data from Par Database" button 306. Another parameter that may be selected, for example, is A, B, and C cutoffs 312. Each point-of-use entity (e.g., a hospital) has a number of point-of-use locations, such as delivery rooms, nursing stations, operating rooms, and emergency rooms, each of which may be assigned a cutoff 312, e.g., A, B or C, which regulates the number of deliveries to be made to each location. For example, if 20% of the locations have the most delivery lines, these may be designated as locations type A, while the locations with the least delivery lines may be designated as type C. The number and values of the cutoffs 312 may vary.

Referring again to FIG. 3A, par settings and/or limits may be saved, exported, modified (e.g., in a spreadsheet file, such as Microsoft Excel®) and/or imported back in by selecting buttons 322. In addition, schedules may be saved, exported, modified (e.g., in a spreadsheet file, such as Microsoft Excel®) and/or imported back in by selecting buttons 320. In one aspect, these parameters may be maximum available quantity and reorder point for a given item.

In accordance with one aspect, the available par type 314 settings may include: (1) current settings; (2) multiple of largest single day use; (3) Economic Order Quantity (EOQ); (4) saved file; and (5) multiple (type (2)) for critical locations, and EOQ (type (3)) for all others. In one aspect, type (1), current settings, is the setting currently used by the end user, e.g., the maximum number of items currently maintained, and the point at which an item is reordered. Type (2), multiple of the largest single day use, may be selected when the desired par is a multiple of the largest single day use during the selected period. For example, if the largest single day use is five boxes of band aids, the maximum number may be a multiple of that (e.g., 4×5=20 boxes of band aids), with a reorder being made when the number of boxes falls below another multiple (e.g., 2×5=10 boxes). Type (3), EOQ, may be selected when the desired par is a predetermined level. For example, for a given item, the item will be available 99% of the time when needed; however, the in-stock inventory and the number of placed items are minimized in order to minimize the costs of ordering the item. Thus, a predetermined level of service may be maintained, while costs are minimized. Type (4), saved file, may be selected when the desired par is read from a saved or input file with customized settings. For example, type (2) par setting may be exported into a file (e.g., a spreadsheet file, such as a Microsoft Excel® file) via the "Export Par" button 322a, and changes may be made into that file to modify the settings. The modified (or any other desired custom file) may be imported via the "Import Par" button 322b. Type (5) is a combination of types (2) and (3), such that type (2) may be used in critical locations (e.g., emergency room) and type (3) may be used in non-critical locations (e.g., dermatology department).

In addition to setting different par types, aspects of the present invention also provide for setting physical limits via, for example, the "Use Physical Limit?" selection box 324, as shown in FIG. 3A. For example, some items may be limited to a certain quantity, due to legal or other requirements, such as size of the item. The limit may be selected via the "Limit Type" pull-down menu 316. In accordance with one aspect, there may be several limit types, including: (1) no more that the currently available quantity; (2) average daily use quantity times a given number of days; and (3) saved or input from file.

In accordance with one aspect, the delivery schedule or delivery days per week may be selected or updated via, for example, the "Set Location Schedule" button 326 and Max-Days selection box 318, as shown in FIG. 3A, and further as shown in more detail in FIG. 3C. For example, if a delivery schedule for an end user is currently seven days per week, and the end user selects five days as the maximum number of delivery days per week, upon entry of the number 5 in the "MaxDays" selection box 318 and selection of the "Suggested Schedule" button 328, the system assigns a 5-day delivery schedule for the end user. Additionally, the system assigns a schedule for each point-of-use location (interchangeably also referred to herein as a par location), as shown in FIG. 3C. Based on the number of days selected and the ABC cutoff setting 330 shown in FIG. 3C for each location, the present invention may assign a specific number of days. For example, locations type A may have deliveries 5 days a week, locations type B—4 days, and locations type C—3 or fewer days a week. The schedule may likewise be set for an entire point-of-use entity (e.g., hospital) or for each par location within the entity. The assigned schedule may then be manually updated, for example, by changing the values shown in FIG. 3C. The schedule may also be exported and/or imported, such as, via the "Export Sched" 320b and "Import Sched" 320a buttons shown in FIG. 3A.

Referring again to FIG. 3A, the vendor settings may be modified via the "Modify Vendor Settings" button 308, as shown in more detain in FIG. 3B. FIG. 3B, in accordance with one aspect, shows a list of all available vendors for all products. Selectable parameters for the vendor settings may include, for example, the lead time 340 (e.g., in days) and whether or not a specific vendor is part of the Value Link 342 (e.g., a different customer distribution or other agreement) program.

Figure 3D:
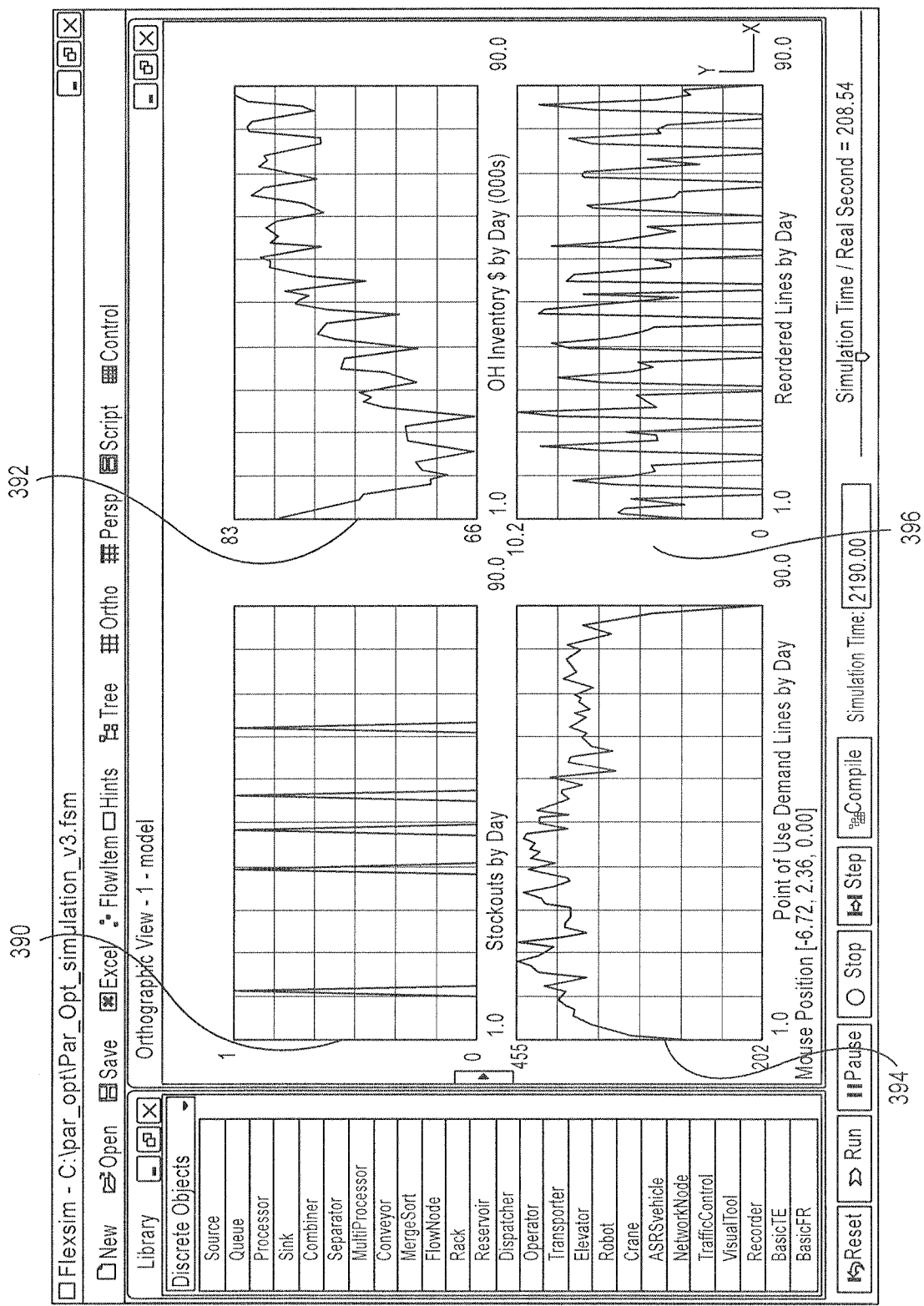

In accordance with one aspect, the selected or updated data may be prepared for simulation via the "Prepare Simulation Data" button 344, as shown in FIG. 3A, for example. An example of a running simulation for a 90-day period of time is shown in FIG. 3F. Chart 390 in FIG. 3D shows the number of stockouts per day for the 90-day period. Chart 392 shows the value of inventory (in dollars) per day for the 90-day period. Chart 394 shows the number of point-of-use demand lines per day, and chart 396 shows the reordered lines per day for the 90-day period.

Referring again to FIG. 3A, an end user is provided with options for updating parameters 352 and re-running the simulation. For example, based on the summary reports from the previous simulation, an end user may identify stockouts 350 and increase the inventory for the relevant items. Alternatively, or in addition, any other available parameter, e.g. delivery schedules 328, may be updated, and the simulation may be re-run to determine the effect of the changes.

Figure 4A:
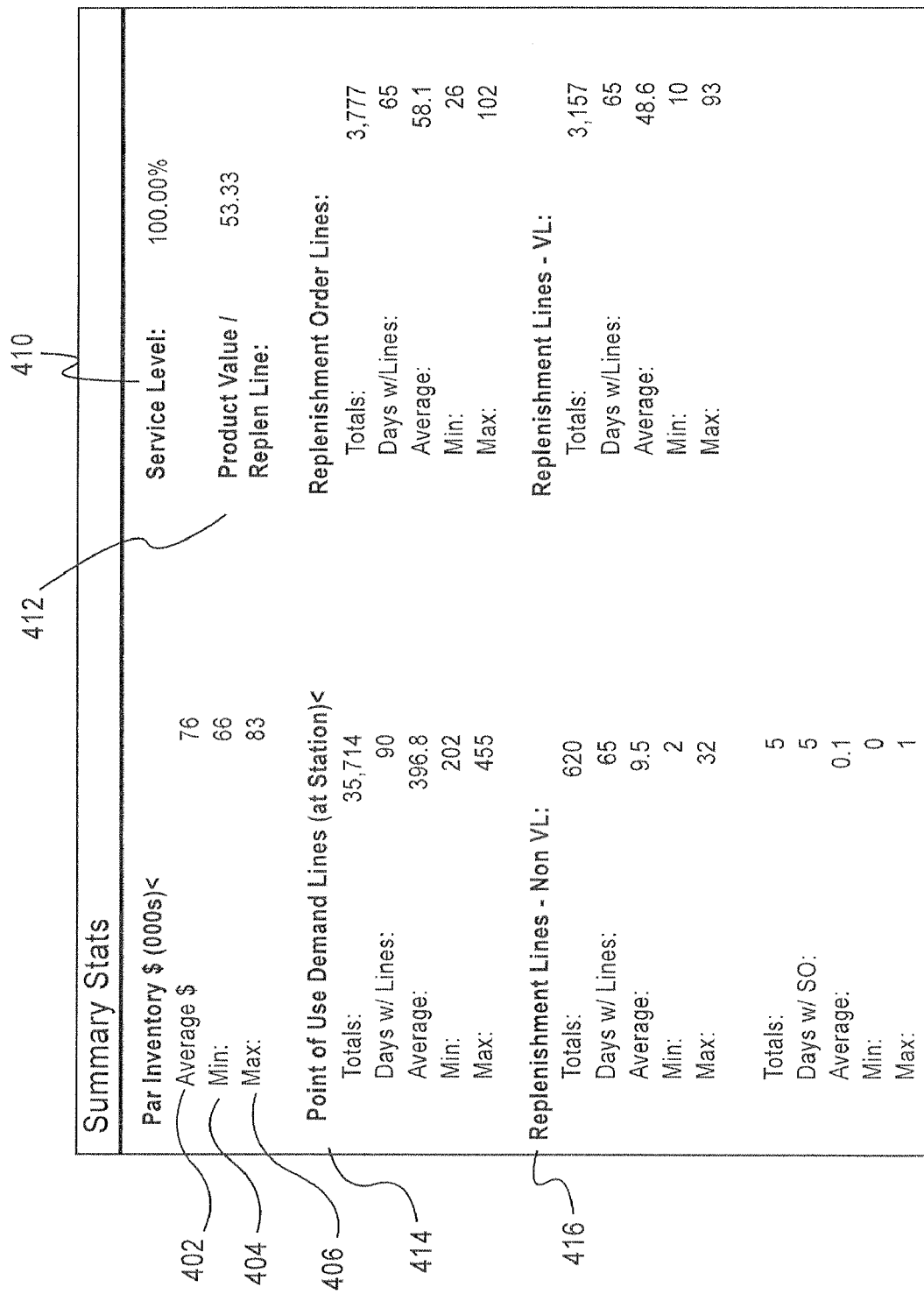
Figure 4B:
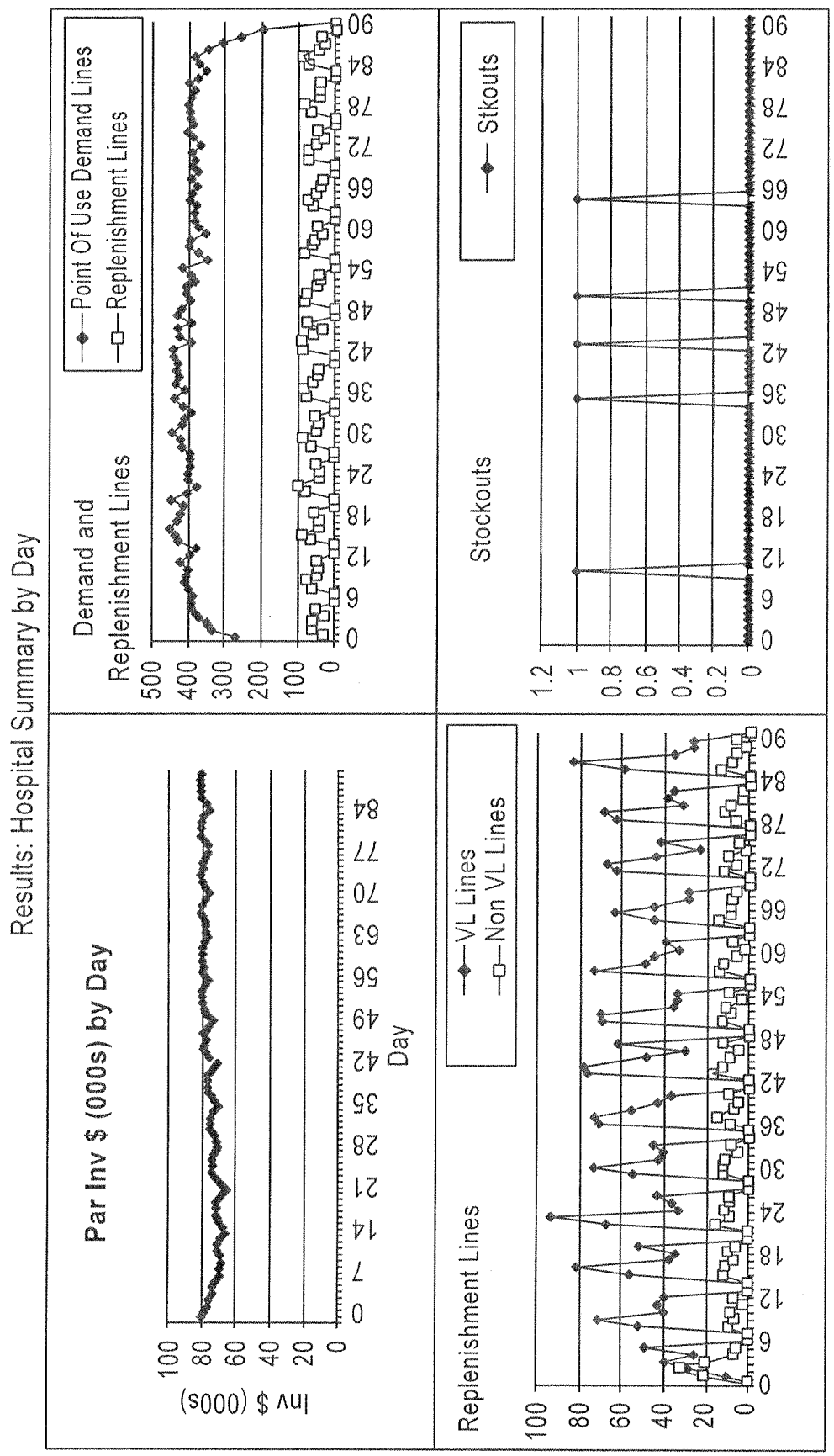
Figure 4F:
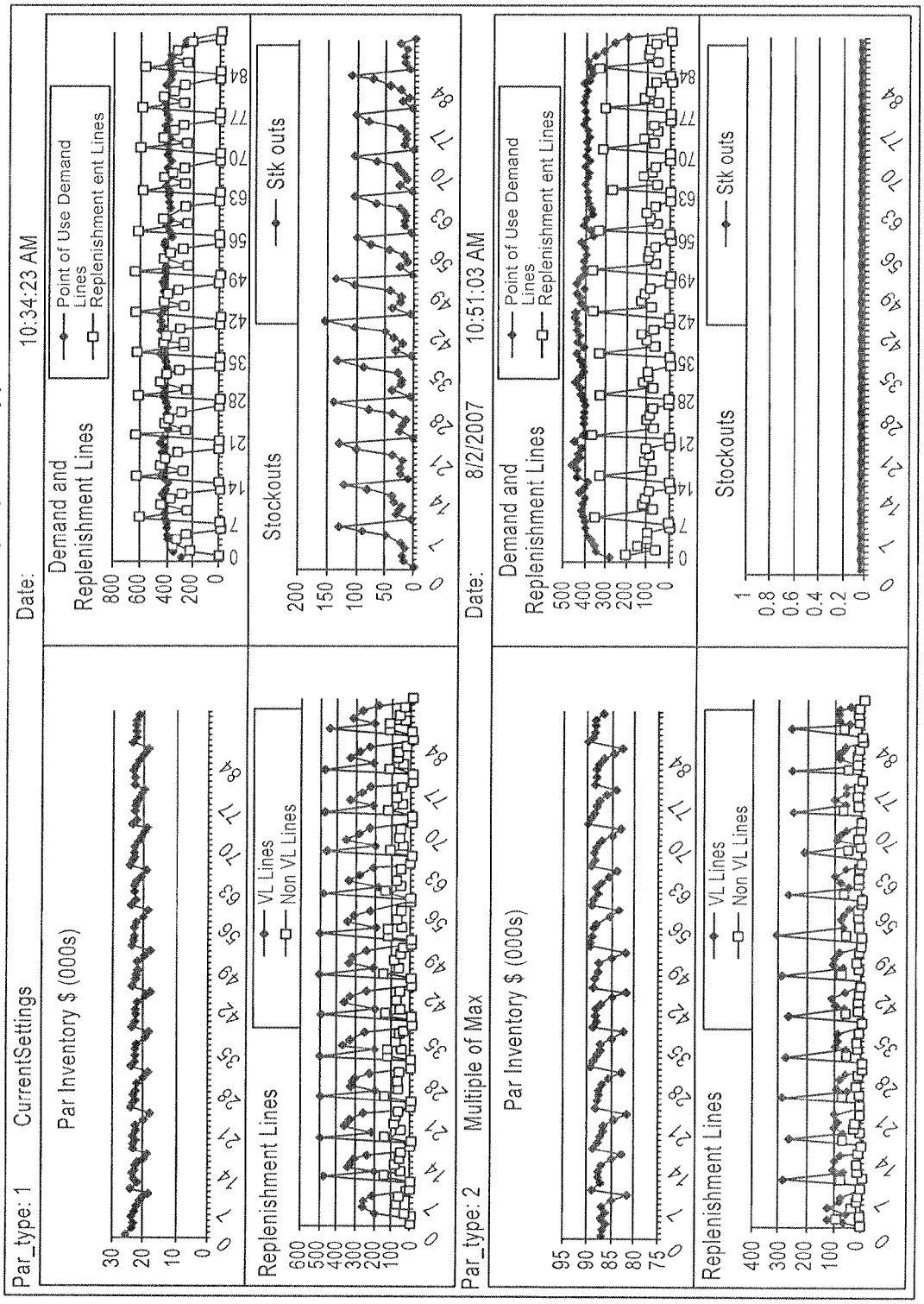

Exemplary simulation results are shown in FIGS. 4A-4H, in accordance with one aspect. FIG. 4A shows the results of the simulation for an entire hospital. As shown in FIG. 4A, for example, the average inventory value 402 for the selected 90-day period is $76,000, the minimum 404 being $66,000, the maximum 406 being $83,000. The service level 410 is shown as being at 100%. The product value per replenishment line 412 is $53.33. This indicator shows the average value of the product each time an order was placed during the 90-day period. The point-of-use demand lines 414, replenishment order lines 416, and other simulation results are also shown. Additional exemplary summary simulation reports may include the results plotted by day, as shown in FIG. 4B; the last run simulation versus a baseline scenario, as shown in FIG. 4C; summary statistics for all par types, as shown in FIG. 4D; detailed results for each par type, as shown in FIG. 4E; chart summaries of par types, as shown in FIG. 4F; par location totals, as shown in FIG. 4G; and summary totals for each vendor, as shown in FIG. 4H. The simulation may be performed for an entire entity, such as a hospital, or for one or more selected par locations within the entity.

Figure 5:
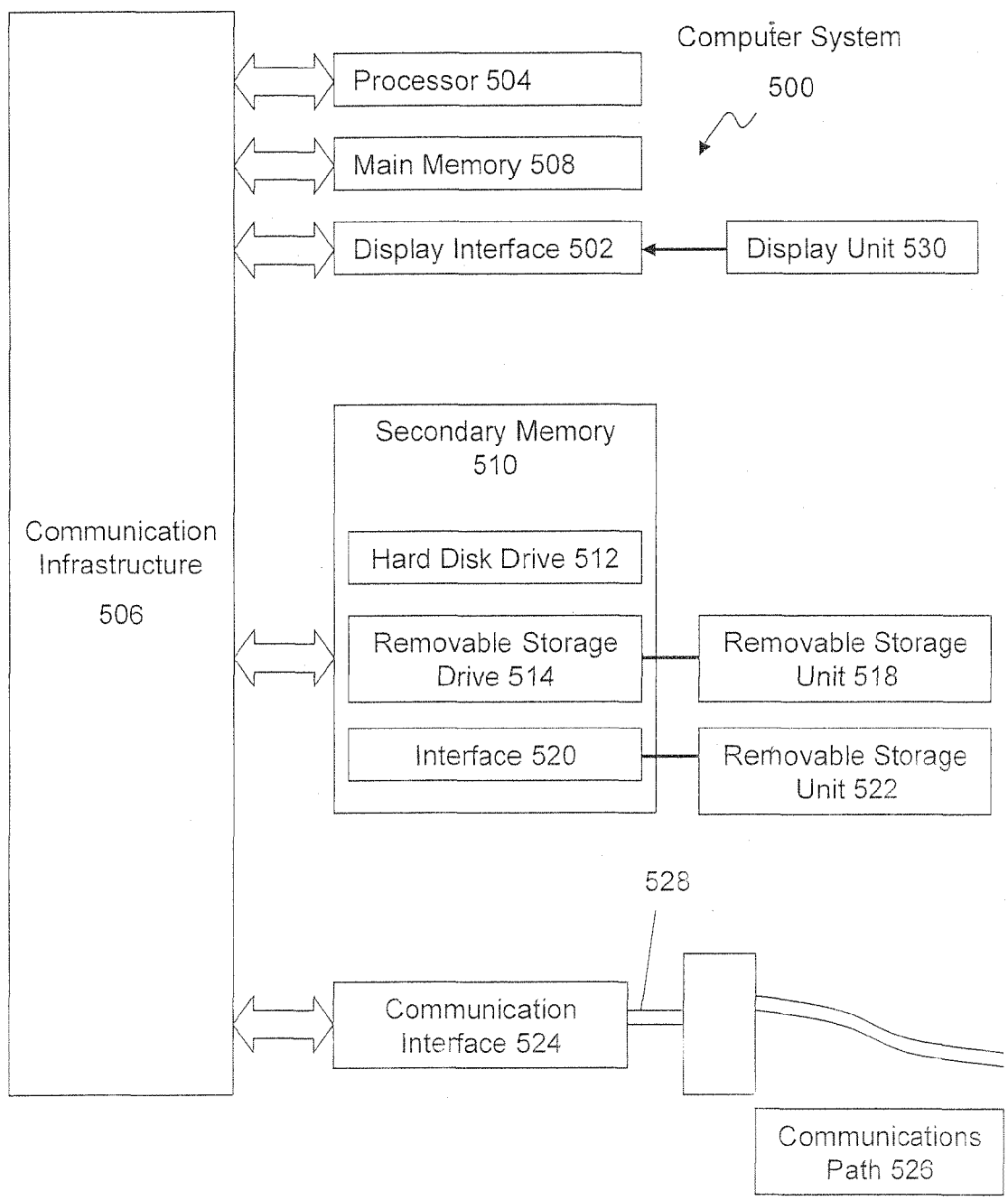
FIG. 5 presents an exemplary system diagram of various hardware components and other features, for use in accordance with an aspect of the present invention.

Aspects of the present invention may be implemented using hardware, software, or a combination thereof and may be implemented in one or more computer systems or other processing systems. In one aspect, the invention is directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 510 to perform the features of the present invention. Accordingly, such computer programs represent controllers of the computer system 500.

In an aspect where the invention is implemented using software, the software may be stored in a computer program product and loaded into computer system 500 using removable storage drive 514, hard drive 512, or communications interface 520. The control logic (software), when executed by the processor 504, causes the processor 504 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 6:
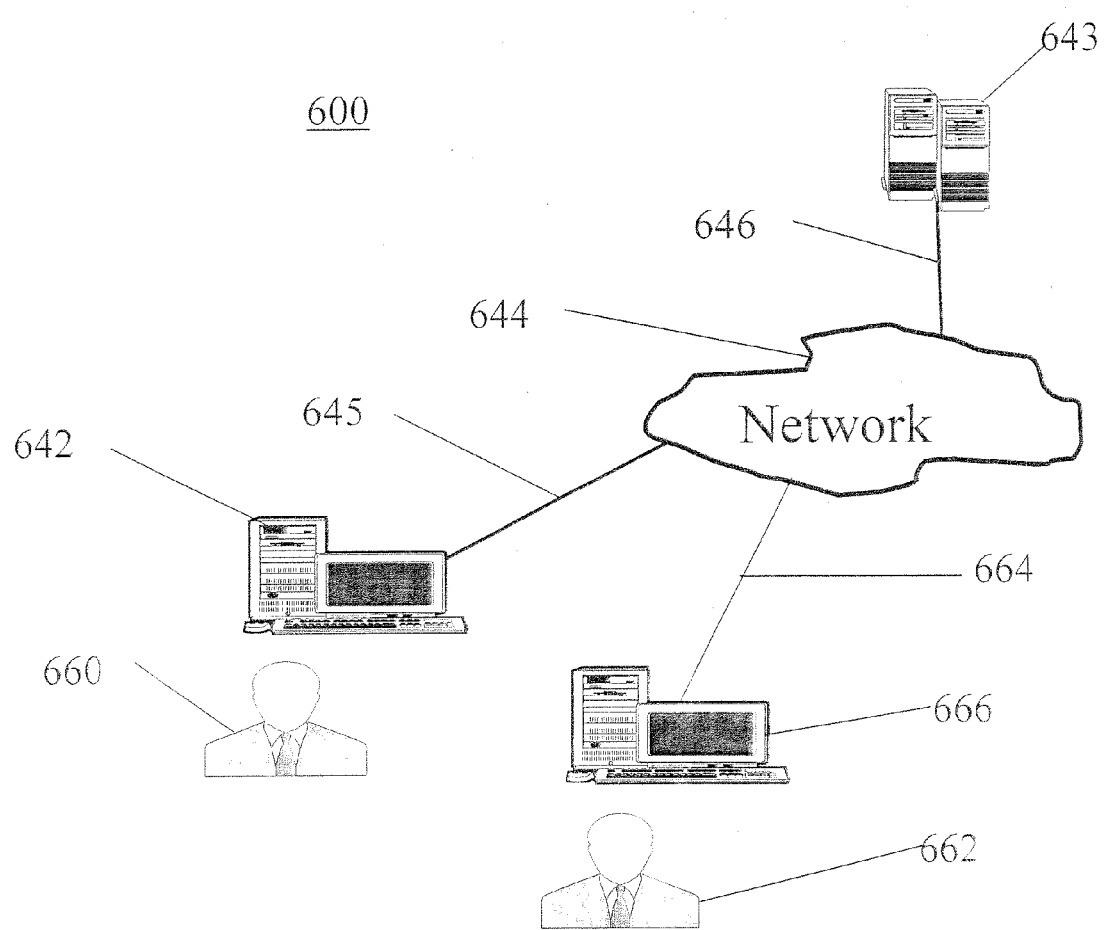
FIG. 6 is a block diagram of various exemplary system components, in accordance with an aspect of the present invention.

FIG. 6 shows a communication system 600 usable in accordance with aspects of the present invention. The communication system 600 includes one or more accessors 660, 662 (also referred to interchangeably herein as one or more "users") and one or more terminals 642, 666. In one aspect, data for use in accordance with aspects of the present invention is, for example, input and/or accessed by accessors 660, 664 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another aspect, the method and system of the present invention operate in a stand-alone environment, such as on a single terminal.

Although the methods and systems of the present invention have been described for entities such as hospitals and medical clinics, it will be apparent to those of ordinary skill in the art that they are equally applicable to other entities, such as grocery stores, or other entities that stock a plurality of point-of-use products.

While the present invention has been described in connection with various aspects, it will be understood by those skilled in the art that variations and modifications of the aspects described above may be made without departing from the scope of the invention. Other aspects will be apparent to those skilled in the art from a consideration of the description or from a practice of the invention disclosed herein.

The invention claimed is:

1. A computer method for par optimization, the computer having a processor, a user interface functioning via the processor, and a repository accessible via the processor, the method comprising:
   receiving actual par data for a first simulation of product use into the repository;
   receiving a selection of a date range for the first simulation via the user interface;
   receiving parameters for the first simulation via the user interface, the parameters including par type and delivery schedule;
   performing, via the processor, the first simulation based on the actual par data, the selected date range, and the simulation parameters, to provide results for the first simulation;
   outputting the results for the first simulation on an output device; and
   setting product par levels based upon the outputted results.

2. The method of claim 1, wherein the simulation parameters further include vendor settings.

3. The method of claim 1, further comprising:
   receiving, via the user interface, an update of an item selected from a group consisting of the actual par data for the first simulation, the selected date range for the first simulation, and the parameters for the first simulation; and
   performing, via the processor, a second simulation based on the updated item.

4. The method of claim 3, further comprising:
   comparing, via the processor, the results for the first simulation with the results for the second simulation.

5. The method of claim 4, further comprising:
   based on the comparison, maintaining optimum par inventory levels.

6. The method of claim 1, further comprising:
   creating an optimal delivery schedule of products based upon the results of the first simulation.

7. The method of claim 1, further comprising:
   assigning a cutoff to one or more point-of-use locations associated with the actual par data based upon the results of the first simulation,
   wherein the cutoff regulates a number of deliveries of products to be made to each of the one or more point-of-use locations.

8. A system for par optimization, the system comprising:
   a processor;
   a user interface functioning via the processor; and
   a repository accessible by the processor;
   wherein actual par data for a first simulation of product use are received into the repository;
   wherein a selection of a date range for the first simulation is received via the user interface;
   wherein parameters for the first simulation are received via the user interface, the parameters including par type and delivery schedule;
   wherein the first simulation is performed via the processor based on the actual par data, the selected date range, and the simulation parameters, to provide results for the first simulation;
   wherein the results for the first simulation are output on an output device; and
   wherein product par levels are set based upon the outputted results.

9. The system of claim 8, wherein the processor is housed on a terminal.

10. The system of claim 9, wherein the terminal is selected from a group consisting of a personal computer, a minicomputer, a main frame computer, a microcomputer, a hand held device, and a telephonic device.

11. The system of claim 8, wherein the processor is housed on a server.

12. The system of claim 11, wherein the server is selected from a group consisting of a personal computer, a minicomputer, a microcomputer, and a main frame computer.

13. The system of claim 11, wherein the server is coupled to a network.

14. The system of claim 8, wherein the repository is housed on a server.

15. The system of claim 14, wherein the server is coupled to a network.

16. A system for par optimization, the system having a processor, a user interface functioning via the processor, and a repository accessible via the processor, the system comprising:
   means for receiving actual par data for a first simulation of product use into the repository; means for receiving a selection of a date range for the first simulation via the user interface;
   means for receiving parameters for the first simulation via the user interface, the parameters including par type and delivery schedule;
   means for performing, via the processor, the first simulation based on the actual par data, the selected date range, and the simulation parameters, to provide results for the first simulation;

means for outputting the results for the first simulation on an output device; and means for setting product par levels based upon the outputted results.

17. The system of claim 16, wherein the simulation parameters further include vendor settings.

18. The system of claim 16, further comprising:
means for receiving, via the user interface, an update of an item selected from a group consisting of the actual par data for the first simulation, the selected date range for the first simulation, and the parameters for the first simulation; and
means for performing, via the processor, a second simulation based on the updated item.

19. The system of claim 18, further comprising:
means for comparing, via the processor, the results for the first simulation with the results for the second simulation.

20. The system of claim 19, further comprising:
means for maintaining optimum par inventory levels based on the comparison.

21. A computer program product comprising a non-transitory computer usable medium having control logic stored therein for causing a computer to optimize par inventory levels, the computer having a processor, a user interface functioning via the processor, and a repository accessible via the processor, the control logic comprising:
computer readable program code means for receiving actual par data for a first simulation of product use into the repository;
computer readable program code means for receiving a selection of a date range for the first simulation via the user interface;
computer readable program code means for receiving parameters for the first simulation via the user interface, the parameters including par type and delivery schedule;
computer readable program code means for performing, via the processor, the first simulation based on the actual par data, the selected date range, and the simulation parameters, to provide results for the first simulation;
computer readable program code means for outputting the results for the first simulation on an output device; and
computer readable program code means for setting product par levels based upon the outputted results.

* * * * *